United States Patent
Abedini et al.

(10) Patent No.: US 10,176,574 B2
(45) Date of Patent: *Jan. 8, 2019

(54) STRUCTURE-PRESERVING COMPOSITE MODEL FOR SKIN LESION SEGMENTATION

(71) Applicant: International Business Machines Corporation, Armonk, NY (US)

(72) Inventors: Mani Abedini, Melbourne (AU); SeyedBehzad Bozorgtabar, Melbourne (AU); Rahil Garnavi, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,590

(22) Filed: Dec. 31, 2017

(65) Prior Publication Data
US 2018/0122072 A1 May 3, 2018

Related U.S. Application Data

(63) Continuation of application No. 15/435,654, filed on Feb. 17, 2017.
(Continued)

(51) Int. Cl.
*G06T 7/00* (2017.01)
*G06K 9/62* (2006.01)
(Continued)

(52) U.S. Cl.
CPC ............ *G06T 7/0012* (2013.01); *G06K 9/342* (2013.01); *G06K 9/6223* (2013.01);
(Continued)

(58) Field of Classification Search
None
See application file for complete search history.

(56) References Cited

U.S. PATENT DOCUMENTS

| | | | |
|---|---|---|---|
| 2006/0036372 A1* | 2/2006 | Yener | G06K 9/0014 702/19 |
| 2017/0231550 A1* | 8/2017 | Do | A61B 5/444 382/128 |
| 2018/0061046 A1* | 3/2018 | Bozorgtabar | G06T 7/0012 |

OTHER PUBLICATIONS

Ahn et al., "Automated Saliency-Based Lesion Segmentation in Dermoscopic Images," Engineering in Medicine and Biology Society (EMBC), 2015 37th Annual International Conference of the IEEE.*

(Continued)

*Primary Examiner* — Soo Shin
(74) *Attorney, Agent, or Firm* — David M. Quinn; Otterstedt, Ellenbogen & Kammer, LLP

(57) ABSTRACT

A structure-preserving composite model for skin lesion segmentation includes partitioning a dermoscopic image into superpixels at a first scale. Each superpixel is a vertex on a graph defined by color coordinates and spatial coordinates, and represents a number of pixels of the dermoscopic image according to the first scale. Further, constructing a plurality of k background templates by k-means clustering selected ones of the superpixels in space and color. Additionally, generating sparse representations of the plurality of superpixels based on the plurality of background templates. Also, calculating a reconstruction error for each superpixel by comparison of its sparse representation to its original color coordinates and spatial coordinates. Furthermore, outputting a confidence map that identifies each pixel of the dermoscopic image as belonging or not belonging to a skin lesion, based on the reconstruction errors of the representative superpixels.

11 Claims, 9 Drawing Sheets

Related U.S. Application Data

(60) Provisional application No. 62/297,431, filed on Feb. 19, 2016.

(51) Int. Cl.
  | | |
  |---|---|
  | *G06K 9/34* | (2006.01) |
  | *G06T 7/11* | (2017.01) |
  | *G06T 7/143* | (2017.01) |
  | *G06T 7/162* | (2017.01) |
  | *G06T 7/90* | (2017.01) |

(52) U.S. Cl.
  CPC ......... *G06K 9/6244* (2013.01); *G06K 9/6249* (2013.01); *G06T 7/11* (2017.01); *G06T 7/143* (2017.01); *G06T 7/162* (2017.01); *G06T 7/90* (2017.01); *G06K 2209/05* (2013.01); *G06T 2207/10024* (2013.01); *G06T 2207/20016* (2013.01); *G06T 2207/20072* (2013.01); *G06T 2207/20076* (2013.01); *G06T 2207/20081* (2013.01); *G06T 2207/30041* (2013.01); *G06T 2207/30088* (2013.01); *G06T 2207/30096* (2013.01); *G06T 2207/30101* (2013.01)

(56) References Cited

OTHER PUBLICATIONS

Revenu et al., "Graph-based skin lesion segmentation of multispectral dermoscopic images," 2014 IEEE International Conference on Image Processing (ICIP).*

Jiang et al., "Automatic Salient Object Segmentation Based on Context and Shape Prior," Proceedings of the British Machine Vision Conference, BMVA Press, Sep. 2011.*

R. Braun et al., "Dermoscopy of pigmented lesions", J. Am. Acad. Dermatology (2005) v. 52(1) pp. 109-121.

R. Garnavi et al., "Computer-aided diagnosis of melanoma using border and wavelet-based texture analysis", IEEE Trans. Inf. Technol. Biomed. (2012) v. 16(6) pp. 1239-1252.

R. Achanta et al., "SLIC superpixels compared to state-of-the-art superpixel methods", IEEE Trans. Pattern Anal. and Machine Intell. (May 2012) v. 34(11) pp. 2274-2282.

A.C. Geller et al., "Screening, early detection, and trends for melanoma: Current status (2000-2006) and future directions", J. Am. Acad. Dermatology (2007) v. 57, pp. 555-572.

C.M. Balch et al., "Prognostic factors analysis of 17,600 melanoma patients: validation of the american joint committee on cancer melanoma staging system," Journal of Clinical Oncology (2001) v. 19, pp. 3622-3634.

M. Silveira et al., "Comparison of Segmentation Methods for Melanoma Diagnosis in Dermoscopy Images", IEEE Journal of Selected Topics in Signal Processing (2009) v. 3(1), pp. 35-45.

H. Ganster et al., "Automated melanoma recognition", IEEE Trans Med Imaging (2001) v. 20(3) pp. 233-239.

B. Erkol et al., "Automatic lesion boundary detection in dermoscopy images using gradient vector flow snakes", Skin Res Technol. (2005) v. 11(1): pp. 17-26.

J.C. Nascimento et al., "Adaptive snakes using the EM algorithm", IEEE Trans Image Process. (2005) v. 14(11):1678-86.

T. Chan et al., "Active contours without edges for vector-valued images," J. Vis. Commun. Image Repres. (2000) v. 11(2), pp. 130-141.

Various, "Expectation-maximization algorithm", Wikipedia (Feb. 7, 2017) https://en.wikipedia.org/wiki/Expectation-maximization_algorithm. p. 1-13.

J. Maeda et al., "Perceptual Image Segmentation Using Fuzzy-Based Heirarchical Algorithm and Its Application to Dermoscopy Images" Proc. of 2008 IEEE Conference on Soft Computing in Industrial Applications, p. 66-71.

M.E. Celebi et al., "Border Detection in Dermoscopy Images Using Statistical Region Merging," Skin Research and Technology (2008) v. 14(3), pp. 347-353.

C. Li et al., "Minimization of region-scalable fitting energy for image segmentation." IEEE Trans Image Process. (2008) v. 17(10): pp. 1940-1949.

A. Wong et al., "Automatic skin lesion segmentation via iterative stochastic region merging." IEEE Trans Int Technol. Biomed (2011) v. 15(6): pp. 929-936.

NIST, "The NIST Definition of Cloud Computing", Special Publication 800-145 (Sep. 2011). pp. 1-7.

D. Comaniciu et al., "Mean Shift: A Robust Approach Toward Feature Space Analysis", IEEE Trans. on Pattern Analysis and Machine Intelligence (2002) v. 24(5), pp. 603-619.

J. Shi et al., "Normalized Cuts and Image Segmentation", IEEE Trans. on Pattern Analysis and Machine Intelligence (2000) v. 22(8), pp. 888-905.

Ahn et al., "Automated saliency-based lesion segmentation in dermoscopic images", Proc. Engineering in Medicine and Biology Society (EMBC), 2015 37th Annual International Conference of the IEEE, Aug. 2015, pp. 3009-3012.

Revenu et al., "Graph-based skin lesion segmentation of multispectral dermoscopic images", 2014 IEEE International Conference on Image Processing (CIP).

Cavalcanti et al., "Pigmented Skin Lesion Segmentation on Macroscopic Images", Proc. 25th Intl. Conf. of Image and Vision Computing New Zealand, Nov. 2010, pp. 400-406.

Alcon et al., "Automatic Imaging System With Decision Support for Inspection of Pigmented Skin Lesions and Melanoma Diagnosis", IEEE J. Sel. Topics in Signal Processing, Feb. 2009, v. 3:1, pp. 14-25.

Ridler et al., "Picture Thresholding Using an Iterative Selection Method", IEEE Trans. on Systems, Man, and Cybernetics, v. SMC-8(8), Aug. 1978, pp. 630-632.

Gutman et al., "Skin Lesion Analysis toward Melanoma Detection: A Challenge at the International Symposium on Biomedical Imaging (ISBI) 2016, hosted by the International Skin Imaging Collaboration (ISIC)", arXiv:1605.01397v1, May 2016, pp. 1-5.

Garnavi et al., "Border detection in dermoscopy images using hybrid thresholding on optimized color channels", Computerized Medical Imaging and Graphics 35, Mar. 2011, pp. 105-115.

Sezgia et al., "Survey over image thresholding techniques and quantitative performance evaluation", J. Electronic Imaging 13(1), Jan. 2004, pp. 146-165.

Gupta et al., "KL divergence based agglomerative clustering for automated vitiligo grading", Proc. IEEE Conference on Computer Vision and Pattern Recognition, Jun. 2015, pp. 2700-2709.

Li et al., "Contextual hypergraph modeling for salient object detection", Proc. IEE Intl. Conf. Computer Vision, Aug. 2013, pp. 3328-3335.

OTSU, "A threshold selection method from gray-level histograms", IEEE Trans. on Systems, Man, and Cybernetics, v. SMC-9(1), Jan. 1979, pp. 62-66.

Tong et al., "Salient object detection via bootstrap learning", Proc. IEEE Conf. Computer Vision and Pattern Recognition, Jun. 2015, pp. 1884-1892.

Tseng, "On accelerated proximal gradient methods for convex-concave optimization", submitted to Siam J. Control Optim., May 2008.

Mani Abedini et al., published U.S. Appl. No. 15/435,654, filed Feb. 17, 2017, Structure-Preserving Composite Model for Skin Lesion Segmentation, pp. 1-31 plus 9 sheets of drawings.

Paul J. Otterstedt, List of IBM Patents or Patent Applications Treated as Related, Aug. 21, 2018, pp. 1-2.

* cited by examiner

| Methods | AP | JC | DC | AUC |
|---|---|---|---|---|
| Adaptive Thresholding | 0.87 | 0.72 | 0.80 | 0.81 |
| ISO | 0.62 | 0.33 | 0.44 | 0.84 |
| Yen Thresholding | 0.67 | 0.45 | 0.55 | 0.87 |
| Level Set Active Contours | 0.86 | 0.76 | 0.83 | 0.77 |
| Statistical Region Growing | 0.89 | 0.43 | 0.61 | 0.79 |
| Bootstrap Learning | 0.85 | 0.60 | 0.75 | 0.72 |
| Contextual Hypergraph | 0.87 | 0.63 | 0.77 | 0.75 |
| Inventive Method N=100 | 0.91 | 0.74 | 0.85 | 0.93 |
| Inventive Method N=200 | 0.87 | 0.75 | 0.85 | 0.95 |
| Inventive Method N=300 | 0.79 | 0.72 | 0.83 | 0.92 |
| Inventive Method Fusion | 0.86 | 0.76 | 0.86 | 0.96 |

Comparative study between the inventive method and other state-of-the-art methods tested on `PH2' dataset.

*FIG. 4*

| Methods | AP | JC | DC | AUC |
|---|---|---|---|---|
| Adaptive Thresholding | 0.80 | 0.45 | 0.56 | 0.72 |
| ISO | 0.77 | 0.56 | 0.68 | 0.82 |
| Yen Thresholding | 0.77 | 0.58 | 0.67 | 0.81 |
| Level Set Active Contours | 0.79 | 0.46 | 0.58 | 0.70 |
| Statistical Region Growing | 0.76 | 0.43 | 0.55 | 0.73 |
| Bootstrap Learning | 0.75 | 057 | 0.72 | 0.78 |
| Contextual Hypergraph | 0.75 | 0.60 | 0.75 | 0.83 |
| Inventive Method N=100 | 0.79 | 0.63 | 0.77 | 0.83 |
| Inventive Method N=200 | 0.80 | 0.64 | 0.78 | 0.94 |
| Inventive Method N=300 | 0.82 | 0.65 | 0.78 | 0.90 |
| Inventive Method Fusion | 0.86 | 0.67 | 0.80 | 0.91 |

Comparative study between the inventive method and other state-of-the-art methods tested on 'ISBI 2016' dataset.

*FIG. 5*

STRUCTURE-PRESERVING COMPOSITE MODEL FOR SKIN LESION SEGMENTATION

CROSS REFERENCE TO RELATED APPLICATIONS

This application claims the benefit under 35 U.S.C. § 119(e) of U.S. Provisional Patent Appl. No. 62/297,431 filed 19 Feb. 2016 and entitled "STRUCTURE-PRESERVING COMPOSITE MODEL FOR SKIN LESION SEGMENTATION," which is hereby incorporated herein by reference in its entirety for all purposes, including all appendices thereto. This application is a continuation of U.S. patent application Ser. No. 15/435,654 filed Feb. 17, 2017, the complete disclosure of which is expressly incorporated herein by reference in its entirety for all purposes.

BACKGROUND

The present invention relates to the electrical, electronic and computer arts, and, more particularly, to image recognition and the like.

Malignant melanoma is one of the most common and the deadliest type of skin cancer. Melanoma survival rate depends on its stage and thickness; while advanced melanoma is still incurable, it has been shown that early detection of melanoma and immediate surgical excision of the lesion can increase the survival rate by five times. Dermoscopy image analysis has become an important non-invasive tool for the early diagnosis of melanoma. However, due to the subjectivity of human expert interpretation of dermoscopy images, computer aided dermoscopy image analysis has drawn more attention in the last decade. Lesion segmentation and identifying the mole/lesion from the surrounding skin area is the first step in automated dermoscopy image analysis. The accuracy of the skin lesion segmentation is important for an accurate implementation of the downstream steps in ABCD diagnostic technique, because diagnostic features such as asymmetry and border irregularity rely on the border detection results.

SUMMARY

Embodiments of the invention provide a structure-preserving composite model for skin lesion segmentation. In one aspect, an exemplary method includes partitioning a dermoscopic image into a plurality of superpixels at a first scale, wherein each superpixel is a vertex on a graph defined by color coordinates and spatial coordinates, each of the plurality of superpixels representing a number of pixels of the dermoscopic image according to the first scale. The exemplary method further includes constructing a plurality of k background templates by k-means clustering selected ones of the superpixels in space and color. Additionally, the exemplary method includes generating sparse representations of the plurality of superpixels based on the plurality of background templates. The exemplary method also includes calculating a reconstruction error for each superpixel by comparison of its sparse representation to its original color coordinates and spatial coordinates. Furthermore, the exemplary method includes outputting a confidence map that identifies each pixel of the dermoscopic image as belonging or not belonging to a skin lesion, based on the reconstruction errors of the representative superpixels.

According to certain embodiments of the invention, an apparatus includes means for outputting a confidence map that identifies each pixel of a dermoscopic image as belonging or not belonging to a skin lesion. The means include a first software module for partitioning the dermoscopic image into a plurality of superpixels, a second software module for constructing a plurality of background templates based on selected ones of the plurality of superpixels, a third software module for generating sparse representations of the plurality of superpixels based on the plurality of background templates, a fourth software module for calculating reconstruction errors of the sparse representations, and a fifth software module for segmenting the plurality of superpixels as belonging or not belonging to the skin lesion, based on the respective reconstruction error of each of the plurality of superpixels.

According to certain other embodiments of the invention, a computer program product includes a computer readable storage medium that embodies computer executable instructions which when executed by a computer cause the computer to facilitate a method. The method facilitated by the computer includes partitioning a dermoscopic image into a plurality of superpixels at a first scale. Each superpixel is a vertex on a graph defined by color coordinates and spatial coordinates, and each of the plurality of superpixels represents a number of pixels of the dermoscopic image according to the first scale. The method further includes constructing a plurality of k background templates by k-means clustering selected ones of the superpixels in space and color. Additionally, the method includes generating sparse representations of the plurality of superpixels based on the plurality of background templates. The method further includes calculating a reconstruction error for each superpixel by comparison of its sparse representation to its original color coordinates and spatial coordinates. Moreover, the method includes outputting a confidence map that identifies each pixel of the dermoscopic image as belonging or not belonging to a skin lesion, based on the reconstruction errors of the representative superpixels.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Fully automated segmentation of dermoscopy images to identify skin lesion borders.

Enhanced accuracy of automated dermoscopy image segmentation.

Since grading a large set of dermoscopic skin lesions is time-consuming, the proposed system can accurately detect lesion borders without need of any annotations.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 shows in tabular form results of a comparative study on the invention in contrast to state-of-the-art methods;

FIG. 5 shows in tabular form results of another comparative study on the invention in contrast to state-of-the-art methods;

DETAILED DESCRIPTION

Figure 1:
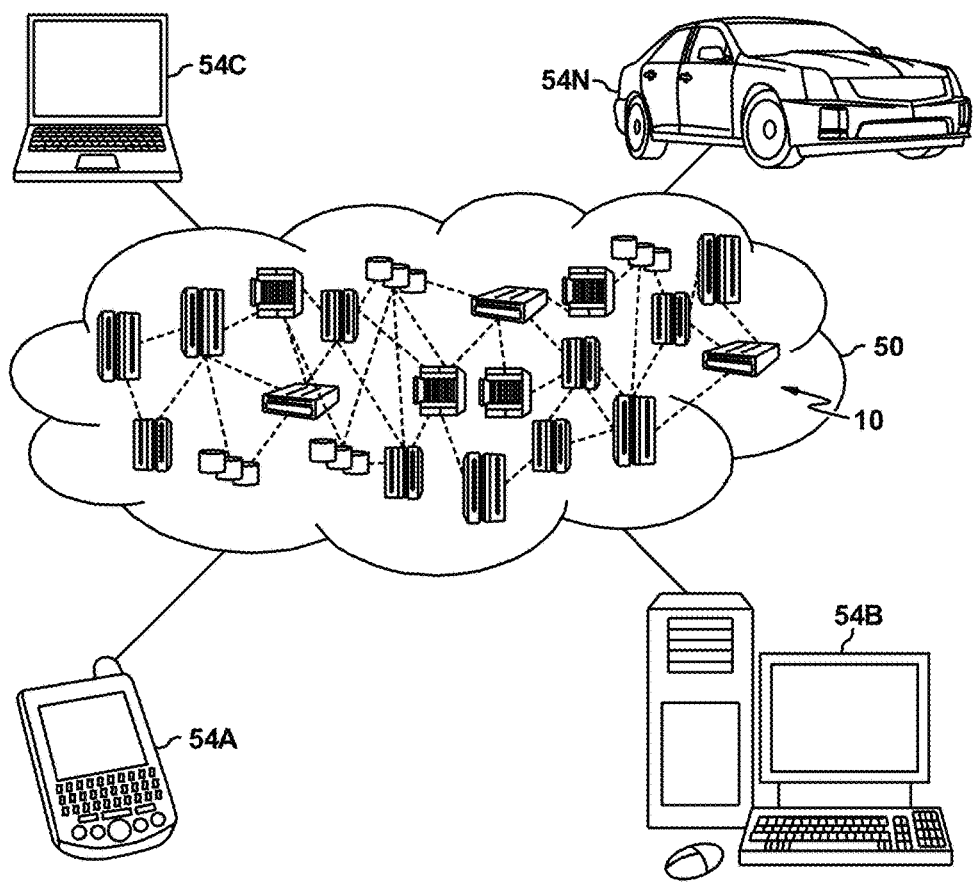
FIG. 1 depicts a cloud computing environment according to an embodiment of the present invention.

The subject matter of the instant application will be described with reference to illustrative embodiments. Numerous modifications can be made to these embodiments and the results will still come within the scope of the invention. No limitations with respect to the specific embodiments described herein are intended or should be inferred.

Although a particular embodiment of the invention is described in detail herein with reference to skin cancer treatment and patient diagnosis with the remote diagnosis by teledermatology, it is to be understood that the invention is equally applicable to blood vessel segmentation in retinal images, and to segmentation of cribriform prostatic glands.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
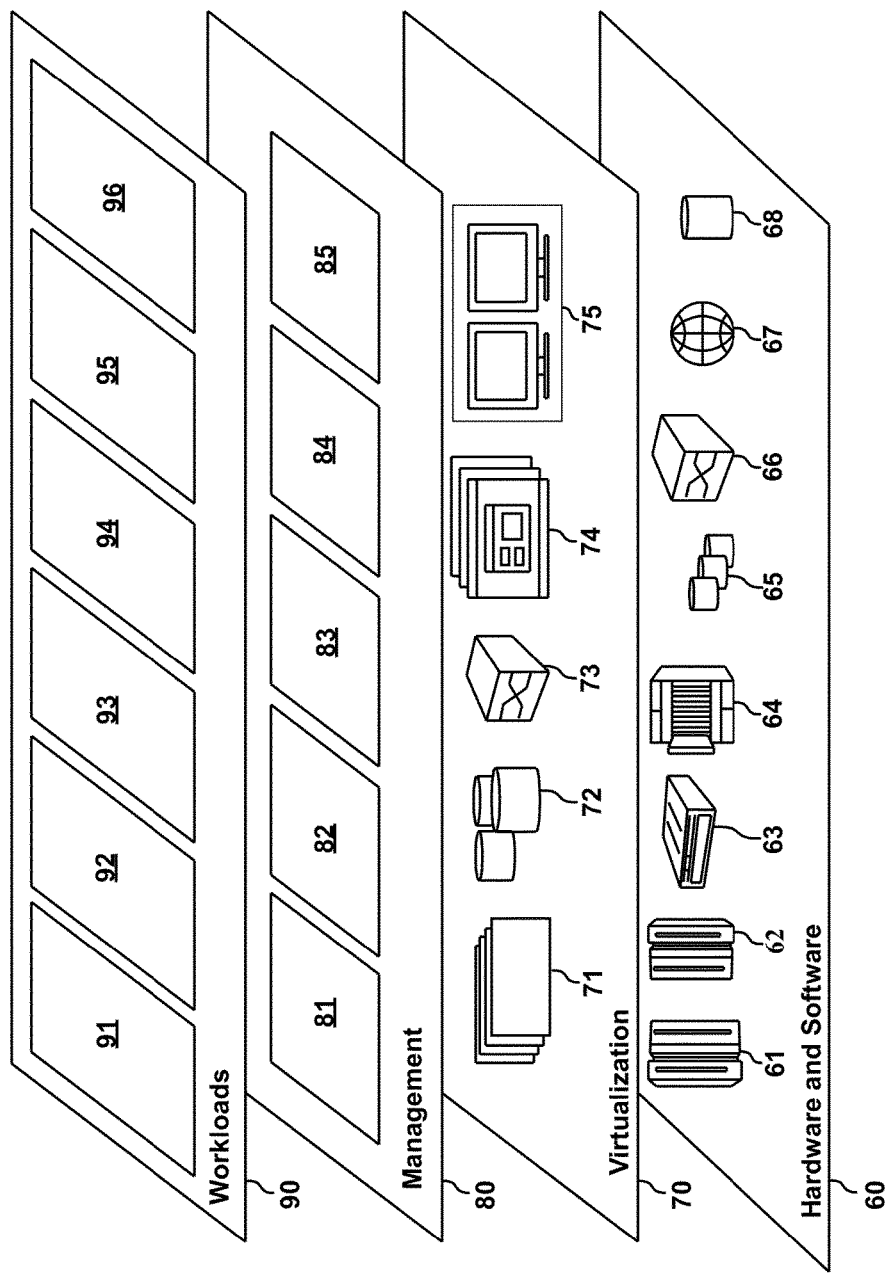
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated skin lesion image segmentation 96.

According to certain aspects of the invention, a superpixel-based skin lesion segmentation is proposed, where different confidence maps are generated for a dermoscopic image at multiple superpixels scales. The term "confidence" refers to the probability of a superpixel belonging to a skin lesion within the dermoscopic image. Aspects of the invention use sparse feature representation to model the confidence (probability) values of the superpixels. These confidence maps are complementary to each other and are combined through a new multi-scale fusion technique to further improve the lesion border detection performance. Aspects of the invention make use of Laplacian multi-task sparse representations, where the similarity of each superpixel to the background seeds (dictionary of the background skin image patches), as well as the pairwise relationship between neighboring superpixels, are exploited jointly, by imposing a graph structure. This graph structure incorporates the color similarities and spatial smoothness constraints of the superpixels. Additionally, aspects of the invention make use of a rule based lesion segmentation refinement, in which each superpixel confidence score is updated based on color properties of the neighboring superpixels.

Figure 3A:
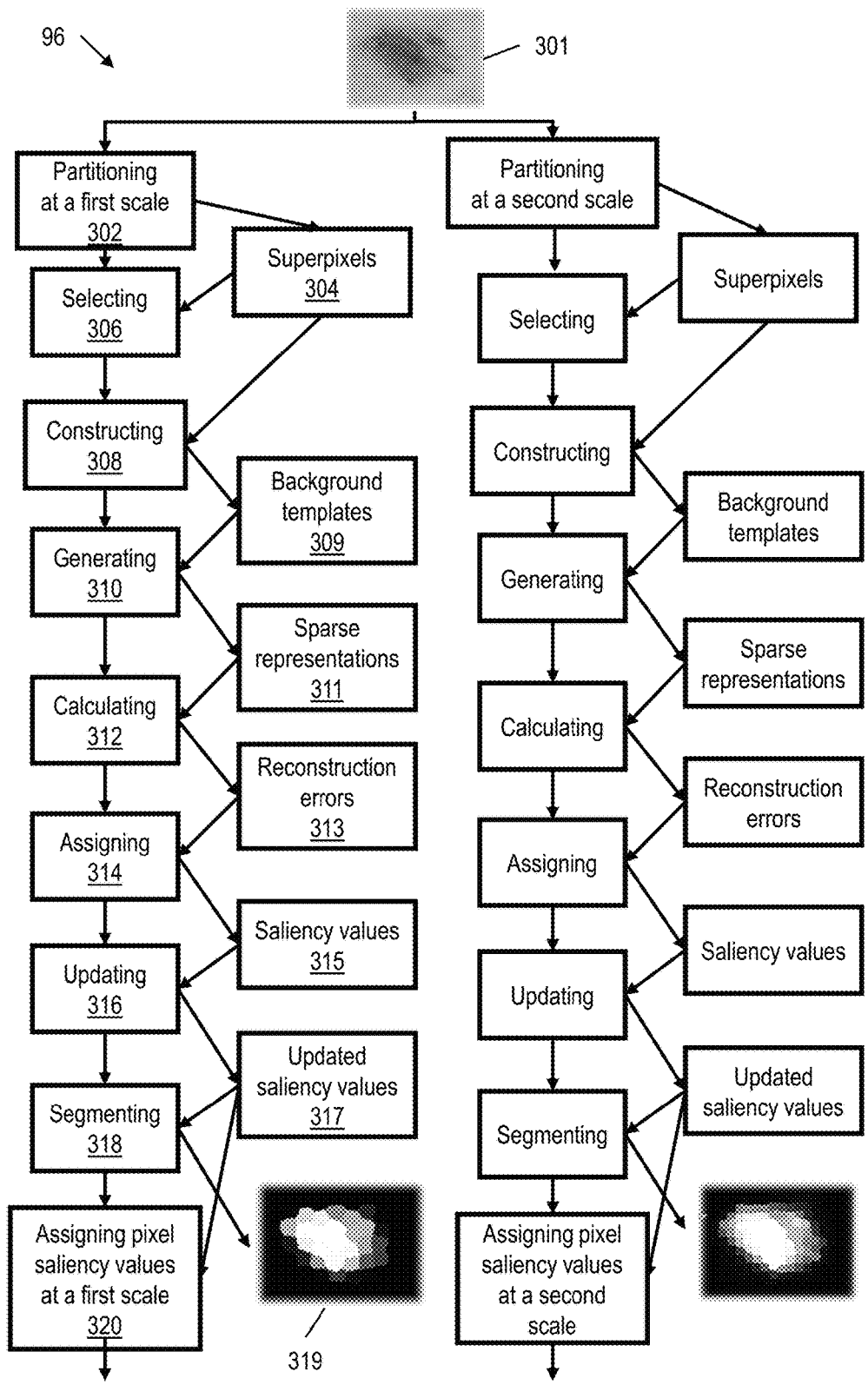
FIGS. 3A-3B depict in a flowchart steps of a method for segmenting a dermoscopic image to detect a skin lesion boundary, according to embodiments of the invention.
Figure 3B:
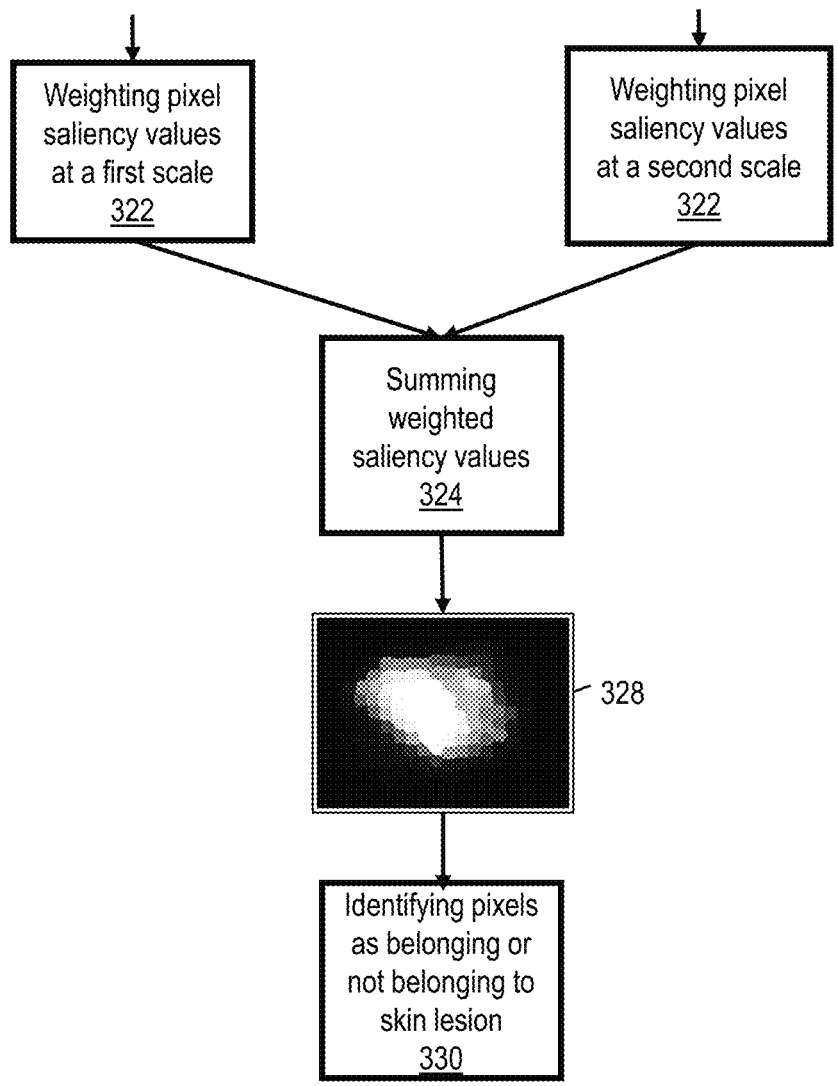

According to some embodiments of the invention, as shown in FIGS. 3A-3B, a computer-implemented method and system 96 provides for automated skin lesion image segmentation. More particularly, embodiments of the inventive method and system cause an input dermoscopic image 301 to be over-segmented at S scales (e.g., a first scale and a second scale as shown in FIGS. 3A-3B). At each scale, a partitioning software module 302 partitions the image 301 into N superpixels 304 where N varies according to the scale. The features of the partitioned image (CIE LAB color features and spatial locations of each of the N superpixels) are denoted in a matrix form as: $Y^s = [y_1^s; \ldots ; y_N^s] \in R^{m \times N}$, where $y_{si}$ is the $i^{th}$ vectorised superpixel features at scale s and m is the feature dimension (e.g., m=6 for three color coordinates and three spatial coordinates). In certain embodiments, the image is partitioned using the Simple Linear Iterative Clustering (SLIC) algorithm. Alternatively, any unsupervised image segmentation techniques such as mean-shift clustering or normalized-cut segmentation can be used to partition the image.

According to certain embodiments, mutual relationships between the superpixels $Y^s$ are described by a graph G that includes vertices V (the superpixels), edges E connecting the superpixels, and edge weights expressed in a matrix $W^s=\{w_{ij}\}\in R^{N\times N}$ in which $w_{ij}$ is a feature similarity measure between superpixel $y_i$ and superpixel $y_j$. For example, $$w_{ij} = \exp\left(-\frac{\|y_i \cdot y_j\|}{\sigma^2}\right)$$

where $\|y_i,y_j\|$ denotes the Euclidean Distance in color space between the superpixels and a is a balance weight. Considering $$d_i = \Sigma_{j=1}^K w_{ij},$$

where $d_i$ is the sum of elements in row i of matrix $W^s$ (i.e., the degree of superpixel i), then $D^s=\text{diag}\{d_1, d_2, \ldots d_N\}\in R^{N\times N}$ is the graph degree matrix, while the Laplacian L can be defined as L=D−W.

Thus, according to certain embodiments, the global contrast between the superpixels 304 within the lesion and the surrounding skin area is formulated as a Laplacian multitask sparse learning problem. The proposed sparse feature representation not only encodes the dissimilarity of each superpixel with respect to the background skin, but also considers the pairwise similarities between neighboring superpixels. As a first step in solving the learning problem, a selecting software module 306 selects superpixels at corners of the image, which are presumed to show the background (non-lesion) skin. This presumption is valid because an image in which the lesion fills the corners will not permit of lesion boundary segmentation (it is not a valid image) and should be discarded by quality screening. According to certain embodiments, a constructing software module 308 then builds a dictionary of sparse seeds or background templates 309 based on the selected corner superpixels. The background templates 309, $$B^s=[b_1^s; \ldots ;b_K^s]\in R^{m\times K},$$

are constructed using k-means clustering under a variety of templates. Then, according to certain embodiments, a generating software module 310 generates a sparse representations matrix 311

$$X^s=[x_1^s; \ldots ;x_N^s]\in R^{K\times N}$$

by solving the following optimization problem:

$$\text{argmin}_X \|Y - BX\|_F^2 + \frac{\lambda_1}{2}Tr(XLX^T) + \lambda_2\|X\|_{2,1} \quad (1)$$

where $\|X\|_{2,1}=\Sigma_{i=1}^K\|X\|_2$, $Tr(XLX^T)=\Sigma_{ij}\|x_i-x_j\|_2^2 w_{ij}$ (which models the pairwise relationships or edges between the superpixels), and $\lambda_1$ and $\lambda_2$ are pre-determined regularization parameters.

The clustered boundary templates B represent possible appearance variations of the superpixels such as color variations, and only a few of these templates are needed to reliably represent each superpixel. Although $l_1$ norm can be used instead of the mixed norm $\|X\|_{2,1}$, experiments demonstrate that the mixed norm advantageously encourages the feature representation matrix to be row sparse, which enhances computing efficiency, especially when the number of clusters increases.

According to some embodiments, a calculating software module 312 calculates a reconstruction error 313 for each superpixel $$\varepsilon_i^s=\|y_i^s-B^s x_i^s\|$$

over the background templates $B^s$, where $x_i^s$ is the sparse representation of the superpixel $y_i^s$. Next, according to select embodiments, an assigning software module 314 sets the probability of an $i^{th}$ superpixel at scale s belonging to the skin lesion (the superpixel's "saliency value" 315) as a function of the superpixel's reconstruction error. In particular, the saliency value $P_i^s$ for each pixel of superpixel i at scale s is assigned 314 as $$P_i^s = \frac{1}{\exp\left(-\frac{\varepsilon_i^s}{\sigma}\right)+\alpha} \quad (2)$$

where $\varepsilon_i^s$ is the reconstruction error of superpixel i at scale s, and a, $\alpha$ are balance weights.

To enhance segmentation accuracy and to further refine the saliency values, an updating software module 316 implements a dynamic rule based strategy to update the saliency value of each superpixel based upon its identified neighbors within the superpixel graph. More particularly, the updating 316 is an iterative process according to $$P^{t+1}=CP^t+(I-C)WD^{-1}P^t \quad (3)$$

where $P^{t=0}$ is $P_i^s$ from equation (2) above, and $C=\text{diag}\{c_1, c_2, \ldots c_N\}\in R^{N\times N}$ with $$c_i = \frac{1}{\max(w_{ij})}.$$

In certain embodiments, different dermoscopic patterns such as globules and/or streaks also are considered as high-level features to measure similarity of the nearby superpixels. For example, during updating 316 of the saliency values, the graph degree matrix D may be trialed against template matrices that correspond to various high-level features.

Thus, the inventive method and system 96 accomplishes dynamic rule-based segmentation refinement. Based on the updated saliency values 317 of the superpixels, and according to certain exemplary embodiments, a segmenting software module 318 then segments the superpixels to produce a confidence map 319 that indicates each superpixel as belonging or not belonging to the skin lesion. In FIG. 3A the confidence map shows superpixels belonging to the skin lesion in bright white, and superpixels not belonging to the skin lesion in black. Pixels with intermediate saliency values are shown in varying shades of gray.

However, since the accuracy of border detection is sensitive to the number of superpixels, according to certain other embodiments of the invention a multi-scale fusion of saliency values is performed for each pixel z. More particularly, a second assigning software module 320 assigns each superpixel's saliency value to the corresponding pixels at that scale. In other words, in case a superpixel represents three hundred pixels, then each of the three hundred pixels is assigned the saliency value of that superpixel. Thus, individual pixel saliency values $P^s(z)$, produced at multiple scales, are weighted 322 and then summed together 324 to construct a strong overall saliency value F(z) for each pixel. For each image pixel, the weight $I^s(z)$ of the saliency value at each scale is determined by measuring the feature similarities between the image pixel z and the corresponding superpixel that the pixel belongs to at that scale:

$$i^s(z)=(\|r(z)-\bar{y}_z^s\|+\beta)^{-1} \quad (4)$$

where r(z) is the feature representation of pixel z (color and spatial coordinates) while $\bar{y}_z^s$ is the mean feature value of the superpixel containing pixel z at scale s. $\beta$ is a constant used to avoid dividing by zero, and may for example be set to 0.2. Then for each pixel z, an overall saliency value F(z) is determined $$F(z) = \frac{1}{\gamma} \sum_{s=1}^{S} I^s(z) \times P^s(z) \qquad (5)$$

On this basis, some embodiments of the inventive method produce a sparse coding based superpixel confidence map 328. Then, according to certain embodiments, F(z) for each pixel is compared to the mean F(z) for the entire image in order to identify whether the pixel belongs to the skin lesion. In case F(z) exceeds the image mean, then an identifying software module identifies 330 the pixel as belonging to the lesion. On the other hand, in case F(z) does not exceed the image mean, then the pixel is identified 330 as not belonging to the lesion.

Experimentally, embodiments of the invention were tested on two datasets against certain conventional methods for automated image segmentation. According to some embodiments of the invention, the parameters $\lambda_1$ and $\lambda_2$ in Eq. 1 were empirically set to 0.04 and 0:4, and the maximum number of iterations for the optimization problem in Eq. 1 and the updating process in Eq. 3 were set to 15 and 5, respectively. The number of clusters K and scales S were both set to 3 by cross-validation. The sparse feature representation of the features (CIE LAB color and spatial location) were computed separately, and then were multiplied to obtain the final features. The balance weights a, a in Eq. 2 were set to 0.1 and 8, respectively. The normalisation factor F(z) in Eq. 5 was computed by summation of scale weights $I_s$. The parameter settings were the same for the two different datasets and were found experimentally. The segmentation performance is not very sensitive to these parameters.

Segmentation performance of the inventive method and of conventional methods were measured using four different metrics: Area Under Curve (AUC), Average Precision (AP), Dice Similarity Coefficient (DSC) and Jaccard Coefficient (JC), which quantify the spatial overlap between the ground truth (expert knowledge) and the obtained segmentation binary mask. For example, DSC is defined as the area $$\frac{2 A_S \cap A_G}{A_S + A_G}$$

where $A_S$ is the area of the segmented image and $A_G$ is the area of the ground truth. The four metrics are well defined in literature. FIGS. 4 and 5 show the performance results for four embodiments of the inventive method, as well as for seven conventional methods of skin lesion segmentation. FIG. 4 shows performance of the various methods on PH2 dataset acquired at Dermatology Service of Hospital Pedro Hispano, Matosinhos, Portugal. This dataset provides 200 dermoscopic images with resolution 768×560 pixels. FIG. 5 shows performance of the various methods on ISBI 2016 challenge dataset, which contains 900 dermoscopic images at varying resolutions from 1022×767 pixels to 4288×2848 pixels. For both datasets, the ground truth image segmentation was provided by experts in the field. Surprisingly, the inventive method outperformed conventional methods for all four performance metrics on both datasets.

Figure 6:
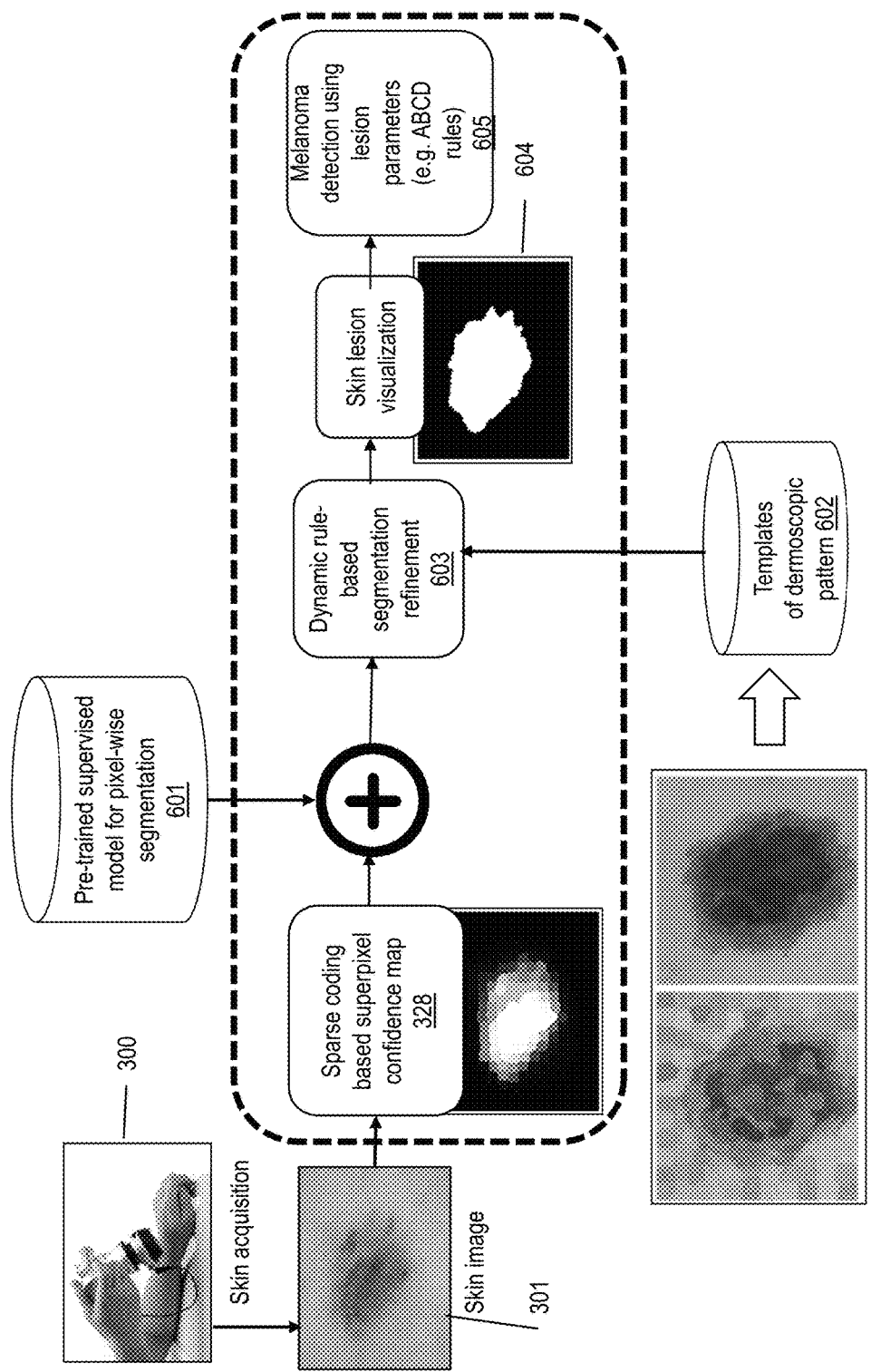
FIG. 6 depicts in schematic form a system configured to implement the method of FIGS. 3A-3B.

Referring to FIG. 6, other embodiments of the inventive system 96 acquire 300 a dermoscopic image 301 and generate a sparse-coding based confidence map 328. Using a pre-trained supervised model 601 for pixel-wise segmentation, the system 96 then will pixel-wise combine the sparse-coding based confidence map 328 with the pixel-wise segmentation output, and will implement dynamic rule-based segmentation refinement 603 on the combined maps, optionally utilizing templates 602 of dermoscopic patterns, in order to produce a smoothed skin lesion visualization 604. The templates of the dermoscopic patterns are obtained by expert knowledge of the locations of "globules" and "streaks" in training dermoscopic images. The system 96 then may implement melanoma detection using lesion parameters (e.g. ABCD rules), for example according to an algorithm 605 as shown in FIG. 7.

Figure 7:
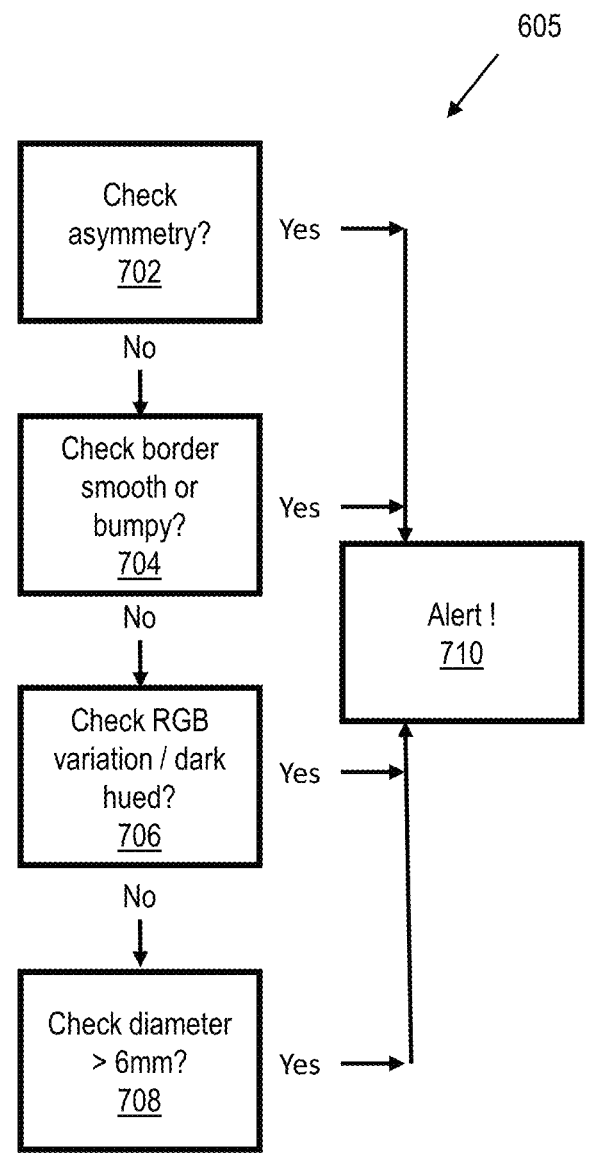
FIG. 7 depicts in flowchart form an algorithm for implementing ABCD testing on segmented dermoscopic images.

FIG. 7 depicts an algorithm 605 for implementing the ABCD rules on the lesion area of a dermoscopic image segmented according to embodiments of the invention. At 702, assess whether the segmented lesion area is asymmetric. If yes, alert 710 to the possibility of melanoma. If no, assess 704 whether the segmented lesion area has an irregular border. If yes, alert 710. If no, then at 706 assess whether the segmented lesion area is non-uniform in color or dark hued. If yes, alert 710. If no, then at 708 assess whether the segmented lesion area exceeds 6 mm diameter (fiducials in the background image will be helpful for this step). If yes, alert 710. If no, then exit.

Given the discussion thus far, it will be appreciated that, in general terms, an exemplary method, according to an aspect of the invention, includes partitioning a dermoscopic image into a plurality of superpixels at a first scale, wherein each superpixel is a vertex on a graph defined by color coordinates and spatial coordinates, each of the plurality of superpixels representing a number of pixels of the dermoscopic image according to the first scale. The exemplary method further includes constructing a plurality of k background templates by k-means clustering selected ones of the superpixels in space and color. Additionally, the exemplary method includes generating sparse representations of the plurality of superpixels based on the plurality of background templates. The exemplary method also includes calculating a reconstruction error for each superpixel by comparison of its sparse representation to its original color coordinates and spatial coordinates. Furthermore, the exemplary method includes outputting a confidence map that identifies each pixel of the dermoscopic image as belonging or not belonging to a skin lesion, based on the reconstruction errors of the representative superpixels.

Certain implementations of the exemplary method may also include assigning each superpixel an initial saliency value based on its reconstruction error, updating the saliency value of each superpixel based on the saliency values of its spatially adjacent superpixels, segmenting each superpixel as belonging to the skin lesion based on its updated saliency value exceeding a mean saliency value of all the superpixels, or as not belonging to the lesion based on its updated saliency value being less than or equal to the mean saliency value of all the superpixels, and identifying each pixel as belonging or not belonging to the skin lesion according to the segmentation of the representative superpixel. For example, updating the saliency value of each superpixel may include calculating color feature vector distances from the color coordinates of a first superpixel to the color coordinates of each spatially adjacent superpixel, and updating the saliency value of the first superpixel based on the saliency value of each spatially adjacent superpixel scaled by a function of the color feature vector distance between the first superpixel and that spatially adjacent superpixel.

Certain other implementations of the exemplary method may also include partitioning the dermoscopic image at a second scale, constructing a plurality of k background templates at the second scale, generating sparse representations of the superpixels at the second scale, and calculating reconstruction errors for each superpixel at the second scale. Thus, such implementations may include assigning each pixel of the dermoscopic image a plurality of saliency values, each of the plurality of saliency values being based on the reconstruction error of the representative superpixel at a corresponding one of the plurality of scales. Additionally, these implementations may include weighting each of the plurality of saliency values for each pixel according to feature similarities between that pixel and the representative superpixel at the corresponding scale, summing the plurality of weighted saliency values for each pixel to obtain a single overall saliency value for each pixel, and identifying each pixel as belonging to the skin lesion in case its overall saliency value exceeds the mean of the overall saliency values of all the pixels, or as not belonging to the skin lesion in case its overall saliency value does not exceed the mean of the overall saliency values of all the pixels. For example, each saliency value may be assigned as an exponential function of a corresponding reconstruction error. More particularly, according to certain implementations the saliency value $P\_i\hat{\ }s$ for each pixel of superpixel i at scale s is formulated as $P\_i\hat{\ }s=1/(\exp(-(\varepsilon\_i\hat{\ }s)/\sigma)+\alpha)$ wherein $\varepsilon\_i\hat{\ }s$ is the reconstruction error of superpixel i at scale s, and $\alpha,\sigma$ are balance weights.

Certain implementations may include generating the sparse representation based on an optimization ⟦arg ⟦⟦min⟧_x⟧ $\|Y-BX\|$⟧_F^2+λ_½ Tr(XLX^T)+⟦λ_2$\|X\|$⟧_2,1 wherein Y is the matrix of superpixels, B is the matrix of background templates, X is the matrix of sparse representations, L is the Laplacian of a graph of the superpixels, and λ_1 and λ_2 are pre-determined regularization parameters.

According to certain implementations, a spatial component of the sparse representation may be calculated separately from a color component of the sparse representation, and the spatial component may be multiplied by the color component to obtain the sparse representation.

Selected ones of the superpixels may be disposed at corners of the dermoscopic image.

In certain implementations, k-means clustering may be accomplished with k=3.

High-level dermoscopic features may be considered by trialing a superpixels graph degree matrix D against template matrices that correspond to various high-level features.

According to certain embodiments of the invention, an apparatus includes means for outputting a confidence map that identifies each pixel of a dermoscopic image as belonging or not belonging to a skin lesion. The means include a first software module for partitioning the dermoscopic image into a plurality of superpixels, a second software module for constructing a plurality of background templates based on selected ones of the plurality of superpixels, a third software module for generating sparse representations of the plurality of superpixels based on the plurality of background templates, a fourth software module for calculating reconstruction errors of the sparse representations, and a fifth software module for segmenting the plurality of superpixels as belonging or not belonging to the skin lesion, based on the respective reconstruction error of each of the plurality of superpixels.

According to certain embodiments, the first software module partitions the dermoscopic image by implementing Simple Linear Iterative Clustering.

According to some embodiments, the second software module constructs the plurality of background templates by k-means clustering of the selected ones of the plurality of superpixels. For example, k-means clustering where k=3.

According to certain embodiments, the third software module generates sparse representations by solving the optimization problem ⟦arg ⟦⟦min⟧_x⟧$\|Y-BX\|$⟧_F^2+ λ_½ Tr(XLX^T)+⟦λ_2$\|X\|$⟧_2,1 wherein Y is the matrix of superpixels, B is the matrix of background templates, X is the matrix of sparse representations, L is the Laplacian of a graph of the superpixels, and λ_1 and λ_2 are pre-determined regularization parameters.

According to certain embodiments, the fourth software module calculates the reconstruction errors $\varepsilon\_i\hat{\ }s$ according to $\varepsilon\_i\hat{\ }s=|y\_i\hat{\ }s-⟦B\hat{\ }s\ x⟧\_i\hat{\ }s|$.

According to certain embodiments, the fifth software module segments each of the plurality of superpixels as belonging to the skin lesion in case a saliency value of that superpixel exceeds a mean saliency value of the plurality of superpixels, or as not belonging to the skin lesion in case the saliency value of that superpixel does not exceed the mean saliency value of the plurality of superpixels.

According to certain other embodiments of the invention, a computer program product includes a computer readable storage medium that embodies computer executable instructions which when executed by a computer cause the computer to facilitate a method. The method facilitated by the computer includes partitioning a dermoscopic image into a plurality of superpixels at a first scale. Each superpixel is a vertex on a graph defined by color coordinates and spatial coordinates, and each of the plurality of superpixels represents a number of pixels of the dermoscopic image according to the first scale. The method further includes constructing a plurality of k background templates by k-means clustering selected ones of the superpixels in space and color. Additionally, the method includes generating sparse representations of the plurality of superpixels based on the plurality of background templates. The method further includes calculating a reconstruction error for each superpixel by comparison of its sparse representation to its original color coordinates and spatial coordinates. Moreover, the method includes outputting a confidence map that identifies each pixel of the dermoscopic image as belonging or not belonging to a skin lesion, based on the reconstruction errors of the representative superpixels.

Figure 8:
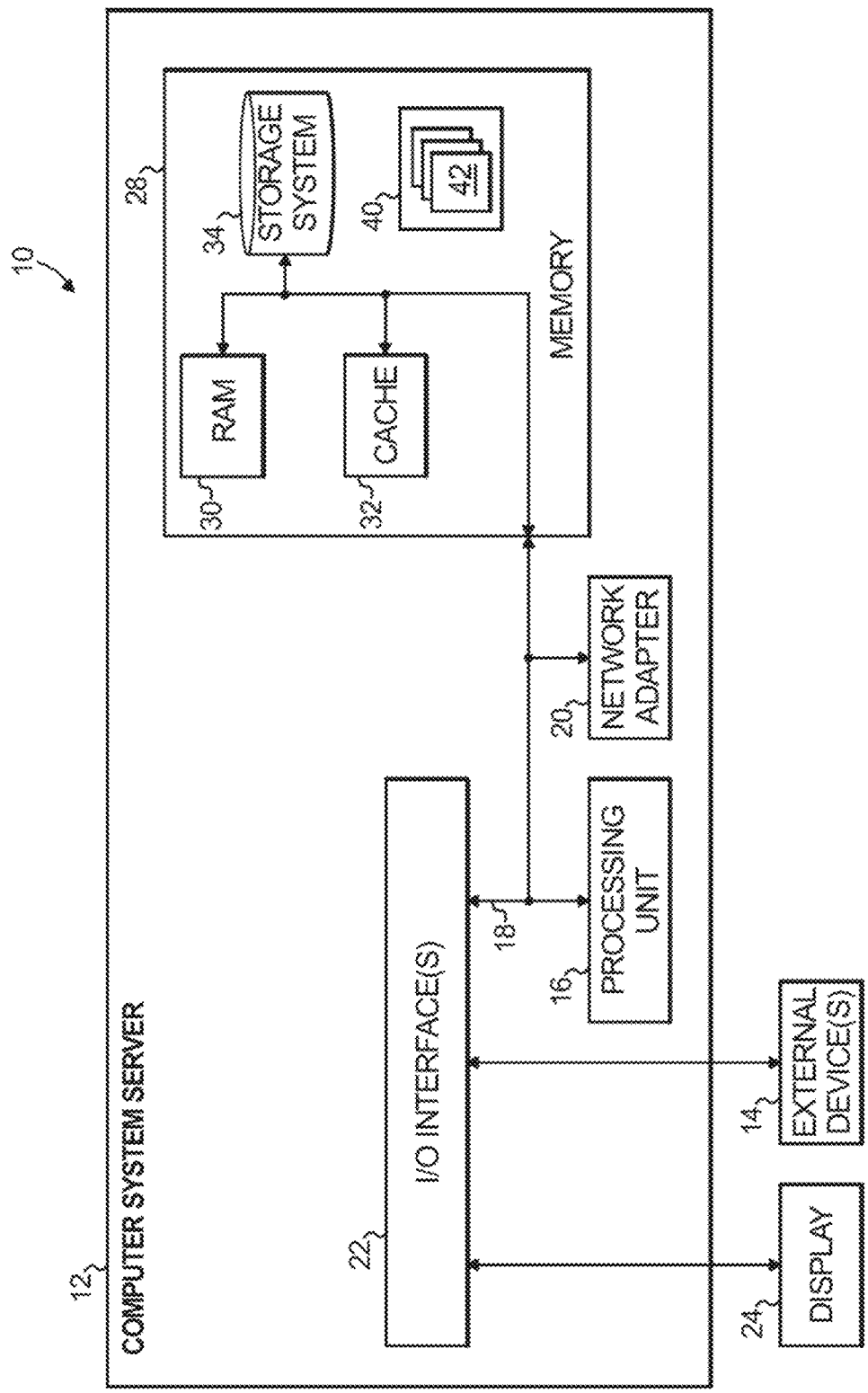
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   partitioning a dermoscopic image into a plurality of superpixels at a first scale, wherein each superpixel is a vertex on a graph defined by color coordinates and spatial coordinates, each of the plurality of superpixels representing a number of pixels of the dermoscopic image according to the first scale;
   constructing a plurality of k background templates by k-means clustering selected ones of the superpixels in space and color from at least one corner superpixel of the dermoscopic image;
   generating sparse representations of the plurality of superpixels based on the plurality of background templates;
   calculating a reconstruction error for each superpixel by comparison of its sparse representation to its original color coordinates and spatial coordinates; and
   outputting a confidence map that identifies each pixel of the dermoscopic image as belonging or not belonging to a skin lesion, based on the reconstruction errors of the representative superpixels.

2. The method of claim 1 further comprising:
   assigning each superpixel an initial saliency value based on its reconstruction error;
   updating the saliency value of each superpixel based on the saliency values of its spatially adjacent superpixels;
   segmenting each superpixel as belonging to the skin lesion based on its updated saliency value exceeding a mean saliency value of all the superpixels, or as not belonging to the lesion based on its updated saliency value being less than or equal to the mean saliency value of all the superpixels; and
   identifying each pixel as belonging or not belonging to the skin lesion according to the segmentation of the representative superpixel.

3. The method of claim 2 wherein updating the saliency value of each superpixel comprises:
   calculating color feature vector distances from the color coordinates of a first superpixel to the color coordinates of each spatially adjacent superpixel; and
   updating the saliency value of the first superpixel based on the saliency value of each spatially adjacent superpixel scaled by a function of the color feature vector distance between the first superpixel and that spatially adjacent superpixel.

4. The method of claim 1 further comprising:
   partitioning the dermoscopic image at a second scale;
   constructing a plurality of k background templates at the second scale;
   generating sparse representations of the superpixels at the second scale; and
   calculating reconstruction errors for each superpixel at the second scale.

5. The method of claim 4 further comprising:
   assigning each pixel of the dermoscopic image a plurality of saliency values, each of the plurality of saliency values being based on the reconstruction error of the representative superpixel at a corresponding one of the plurality of scales;
   weighting each of the plurality of saliency values for each pixel according to feature similarities between that pixel and the representative superpixel at the corresponding scale;
   summing the plurality of weighted saliency values for each pixel to obtain a single overall saliency value for each pixel; and
   identifying each pixel as belonging to the skin lesion in case its overall saliency value exceeds the mean of the overall saliency values of all the pixels, or as not belonging to the skin lesion in case its overall saliency value does not exceed the mean of the overall saliency values of all the pixels.

6. The method of claim 5 wherein each saliency value is assigned as an exponential function of a corresponding reconstruction error.

7. The method of claim 1 further comprising:
generating the sparse representation based on an optimization $$\arg\min_X \|Y - BX\|_F^2 + \frac{\lambda_1}{2} Tr(XLX^T) + \lambda_2 \|X\|_{2,1}$$

wherein Y is the matrix of superpixels, B is the matrix of background templates, X is the matrix of sparse representations, L is the Laplacian of a graph of the superpixels, and $\lambda_1$ and $\lambda_2$ are pre-determined regularization parameters.

8. The method of claim 1 wherein the selected ones of the superpixels are disposed at corners of the dermoscopic image.

9. The method of claim 1 wherein k=3.

10. A computer-implemented method comprising:
partitioning a dermoscopic image into a plurality of superpixels at a first scale, wherein each superpixel is a vertex on a graph defined by color coordinates and spatial coordinates, each of the plurality of superpixels representing a number of pixels of the dermoscopic image according to the first scale;
constructing a plurality of k background templates by k-means clustering selected ones of the superpixels in space and color;
generating sparse representations of the plurality of superpixels based on the plurality of background templates;
calculating a reconstruction error for each superpixel by comparison of its sparse representation to its original color coordinates and spatial coordinates;
partitioning the dermoscopic image at a second scale;
constructing a plurality of k background templates at the second scale;
generating sparse representations of the superpixels at the second scale;
calculating reconstruction errors for each superpixel at the second scale;
assigning each pixel of the dermoscopic image a plurality of saliency values, each of the plurality of saliency values being based on the reconstruction error of the representative superpixel at a corresponding one of the plurality of scales;
weighting each of the plurality of saliency values for each pixel according to feature similarities between that pixel and the representative superpixel at the corresponding scale;
summing the plurality of weighted saliency values for each pixel to obtain a single overall saliency value for each pixel;
identifying each pixel as belonging to the skin lesion in case its overall saliency value exceeds the mean of the overall saliency values of all the pixels, or as not belonging to the skin lesion in case its overall saliency value does not exceed the mean of the overall saliency values of all the pixels; and
outputting a confidence map that identifies each pixel of the dermoscopic image as belonging or not belonging to a skin lesion, based on the reconstruction errors of the representative superpixels;
wherein the saliency value $P_i^s$ for each pixel of superpixel i at scale s is formulated as $$P_i^s = \frac{1}{\exp\left(-\frac{\varepsilon_i^s}{\sigma}\right) + \alpha},$$

wherein $\varepsilon_i^s$ is the reconstruction error of superpixel i at scale s, and $\alpha$, $\sigma$ are balance weights.

11. A computer-implemented method comprising:
partitioning a dermoscopic image into a plurality of superpixels at a first scale, wherein each superpixel is a vertex on a graph defined by color coordinates and spatial coordinates, each of the plurality of superpixels representing a number of pixels of the dermoscopic image according to the first scale;
constructing a plurality of k background templates by k-means clustering selected ones of the superpixels in space and color;
generating sparse representations of the plurality of superpixels based on the plurality of background templates;
calculating a reconstruction error for each superpixel by comparison of its sparse representation to its original color coordinates and spatial coordinates;
wherein a spatial component of the sparse representation is calculated separately from a color component of the sparse representation, and the spatial component is multiplied by the color component to obtain the sparse representation.

* * * * *